A. E. DOMAN.
ELECTRIC STARTING AND LIGHTING SYSTEM FOR MOTOR VEHICLES.
APPLICATION FILED JUNE 23, 1914.
1,247,649.
Patented Nov. 27, 1917.
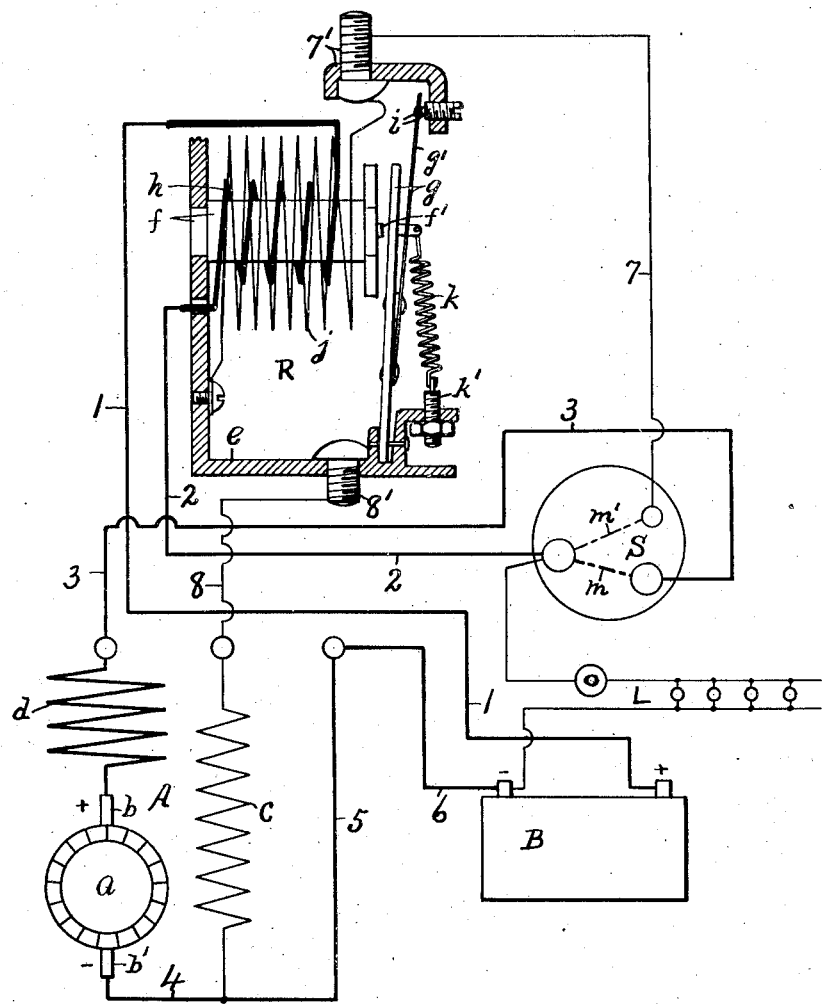

UNITED STATES PATENT OFFICE.

ALBERT E. DOMAN, OF ELBRIDGE, NEW YORK, ASSIGNOR, BY MESNE ASSIGNMENTS, TO DYNETO ELECTRIC CORPORATION, OF SYRACUSE, NEW YORK, A CORPORATION OF NEW YORK.

ELECTRIC STARTING AND LIGHTING SYSTEM FOR MOTOR-VEHICLES.

1,247,649.  Specification of Letters Patent.  Patented Nov. 27, 1917.

Application filed June 23, 1914. Serial No. 846,756.

*To all whom it may concern:*

Be it known that I, ALBERT E. DOMAN, of Elbridge, in the county of Onondaga, in the State of New York, have invented new and useful Improvements in Electric Starting and Lighting Systems for Motor-Vehicles, of which the following, taken in connection with the accompanying drawings, is a full, clear, and exact description.

This invention relates to certain improvements in electric starting and lighting systems for motor vehicles involving the use of a compound-wound dynamo or motor and a storage battery as the sources of energy for such systems. The objects are as follows:

First. To simplify the structural elements and operation of systems of this character.

Second. To limit the maximum current output of the dynamo to a point suitable for the storage battery actually employed with it.

Third. To cause the dynamo to begin to charge the battery at relatively low road speeds of the vehicle.

Fourth. To cause the dynamo to reach its maximum output under comparatively low road speeds and to reduce such output to any desired value under relatively high road speeds.

Other objects and uses relating to specific parts of the system will be brought out in the following description.

The drawing is a diagrammatic view of an electric starting and lighting system embodying the various features of my invention and involving the use of a compound-wound dynamo or motor —A—, which for brevity of description may be termed a dynamo, a storage battery B, a regulator —R— and an electric switch —S—, all cooperatively connected in a manner hereinafter described, the switch —S— having members —m— and —m'—, shown by dotted lines as connecting the terminals of the wire —2— to the adjacent terminals of the wires —3— and —7—, respectively.

The dynamo is provided with the usual commutator —a—, brushes —b— b'—, shunt winding —c— and series winding —d— together with suitable binding posts for the leads, the windings, —c— and —d— being connected in such manner that when operating as a motor their magnetic effects are in harmony to produce an intense magnetic field for the motor armature, while on the other hand when used as a generator, they are in opposition to reduce the intensity of such field as will be apparent from the circuits shown.

This differential intensity of magnetic field is utilized to a certain extent for the regulation of the current output of the dynamo as follows: When the vehicle is driven at relatively high speed the tendency of the dynamo driven thereby is to develop a correspondingly increased amount of current which in turn has a weakening effect upon the magnetic field and produces a certain amount of inherent or automatic regulation of current output.

I have found, however, that this inherent regulation is not sufficient for all requirements without detracting from the efficiency of the apparatus and I have, therefore, provided additional regulating means whereby a suitable resistance may be introduced into the shunt field circuit when the current output of the dynamo reaches a certain desired maximum value, such resistance being so proportioned as to reduce the current output at higher speeds to any value desired to meet requirements.

In order to accomplish this result, the regulator —R— is provided with a magnet frame —e—, a core —f—, an armature —g— and a series winding —h— having one end connected by a wire —1— to the positive pole of the battery —B— and its other end connected by a wire —2— to the switch —S— which, when closed, by a movable member —m—, is connected by a wire —3— to the series winding —d— of the dynamo —A— and thence by return wires —4—, —5— and —6— to the negative pole of said battery.

The armature —g— is normally connected in the shunt circuit of the dynamo through the medium of contact points —i— and wires —7— and —8— leading respectively from separate binding posts —7'— and —8'— on the frame —e— to the switch —S— and the shunt winding —c— so that the shunt circuit of the dynamo leads from the positive pole of the battery —B— to the wire —1—, regulator winding —h—, wire —2— to the switch member —m'—, of the switch —S—, thence to the wire —7—, post —7'—, contacts —i— and armature —g— to the shunt coil —c— and return by wires —5— and —6— to the negative pole of said battery.

These switch members —m— and —m'— may be opened and closed independently of each other, but are preferably closed when the dynamo is operated either as a generator or motor and are both opened when said dynamo or motor is at rest to enable the lighting circuit to be supplied with current from the battery, thereby cutting out both the dynamo and resistance —j— of the regulator.

The function of the switch member —m—, therefore, is to open and close the electrical connection between the battery and series winding of the armature of the dynamo and vice versa, while the function of the switch member —m'— is to open and close the electrical connection between the armature or battery circuit and shunt circuit of the dynamo.

A resistance coil —j— surrounds the magnet core —f— and its series winding —h— and is also connected in the shunt circuit in parallel with the armature —g— by having one end connected to the binding post —7'— and its other end connected to the frame —e—, the number of turns and the resistance being so proportioned as to produce the desired magnetic effect in the core —f— and to reduce the current output of the dynamo to the desired point.

A working circuit as for example a lighting circuit —L— is connected in both the battery and dynamo circuits and for convenience of illustration and simplicity of construction one side is connected to the switch member —m— and its other side to the negative pole of the battery which enables current to be supplied to such working circuit from either source of energy.

It is now clear that when the battery circuit is closed through the dynamo to operate the same as a motor in starting an engine, a very heavy current will be drawn from the battery through the regulator coil —h— thereby attracting the armature —g— and separating the contacts —i— which will cut out the armature from the shunt circuit but will still leave the shunt circuit closed through the resistance coil —j—.

This separation of the contacts —i— and diversion of the battery current through the resistance coil will of course have the effect of weakening the magnetic field and consequent speeding up of the motor which is one of the desired objects in that it provides a higher cranking speed in starting the engine.

As soon as the engine begins to run under its own power, the motor becomes a dynamo or current generator while the battery current will gradually fall to zero and then build up as the direction of current is reversed.

During this transition of the current through the zero period, the magnetic attraction on the armature —g''— will, of course, be sufficiently reduced to allow said armature to be retracted by a spring —k— for restoring the contacts —i— to their normal position, thereby restoring the shunt field to its full strength in which condition it will remain until the charging current flowing into the battery is increased to a certain degree of say 10 amperes at which time any further increase of current will again cause a separation of the contacts —i— and consequent weakening of the shunt field with the resultant reduction of current from the dynamo as previously described.

The reduction of current flowing through the coil —h— would at once cause the release of the armature —g— and closing of the contact —i— except for the fact that the resistance coil —j— has sufficient ampere turns when energized to approximately offset the reduction in ampere turns in the coil —h—, due to the reduced current generated, the main object in placing the coil —j— around the core —f— being to prevent the armature —g— from vibrating which would cause constant wear of the contacts —i—, said resistance coil being preferably wound upon a non-magnetic sleeve (not shown).

One of the contacts —i— is carried by a light leaf spring —g'— on the armature —g— while the other one is so adjusted that both will be separated when the armature is resting against a stop —f'— on the core —f—, the stop —f'— being also adjusted so that the armature —g— will not remain attracted when the current generated falls below a certain degree.

The tension of the spring —k— may also be so adjusted by means of a screw —k'— that the maximum current generated shall not exceed a predetermined degree.

The lighting circuit is connected in the manner described so that current from the dynamo thereto shall not pass through the regulating coil —h— when the switch member —m— is closed whereby the dynamo may carry the working circuit and any current in such circuit will not have a tendency to reduce the output of the dynamo. In other words, the regulator is not influenced by any current used in the working circuit unless the speed of the dynamo is too low to provide the full amount of current used.

The several circuits may be defined as follows:

*Starting circuit*, (switch members —m— and —m'— both closed.)—From the positive pole of the battery —B—, wire —1—, series winding —h— of the regulator, wire —2—, closed switch-member —m—, wire —3—, series winding —d— of the motor, A armature —a— and wires —4—, —5— and —6— to the negative pole of the battery.

*Charging circuit*, (switch members —m— and —m'— both closed.)—From armature —a— to series winding —d—, wire —3—, closed switch member —m—, wire —2—, series winding —h— of the regulator, wire —1— to the positive pole of the battery —B—, returning by wires —6—, —5— and —4— to the armature —a—.

*Battery lighting circuit,* (switch members —m— and —m'— both opened.)—From the positive pole of the battery —B— to wires —1—, winding —h— of the regulator, wire —2— to the working circuit —L— and return to the negative pole of the battery.

*Dynamo lighting circuit.*—From dynamo (switch members —m— and —m'— both closed), from the armature —a— to winding —d—, wire —3—, switch member —m—, lighting circuit —L—, negative binding post of the battery, and return through wires —6—, —5— and —4— to the armature —a—, or in case the speed of the dynamo is too low to provide the full amount of current used, the circuit may be as follows:—from battery —B— wire —1—, coil —h—, wire —2—, lighting circuit —L— to the negative post on the battery.

What I claim is:

1. In an electrical system of the character described, the combination of a compound dynamo, a storage battery and electrical connections between the dynamo and battery for operating the dynamo as a motor and for charging the battery by the dynamo current, the series winding and shunt winding of the dynamo being connected to their respective circuits so that their magnetic effect will be in harmony when the dynamo is operated as a motor and in opposition when the dynamo is generating current, said connections including therein an automatic current regulator comprising an electro-magnet having a primary coil in the battery and armature circuits in series with the series winding of the dynamo, and a resistance coil in shunt with the battery circuit and armature circuit and in series with the shunt winding of the dynamo, both of the regulator coils being arranged to act in harmony as to their magnetic effect, and a short-circuiting switch connected in parallel with the resistance coil to the shunt field circuit of the dynamo and operable by the electro-magnet to cut in the resistance coil when the current in said magnet approximates a certain value.

2. In an electrical system of the character described, the combination of a compound dynamo, a storage battery and electrical connections between the dynamo and battery for operating the dynamo as a motor and for charging the battery by the dynamo current, the series winding and shunt winding of the dynamo being connected to their respective circuits so that their magnetic effect will be in harmony when the dynamo is operated as a motor and in opposition when the dynamo is generating current, said connections including therein an automatic current regulator comprising an electro-magnet having a primary coil in the battery and armature circuits in series with the series armature circuits in series with the series winding of the dynamo, and a resistance in shunt with the battery circuit and armature circuit and in series with the shunt winding of the dynamo, both of the regulator coils being arranged to act in harmony as to their magnetic effect, and a short-circuiting switch connected in parallel with the resistance coil to the shunt field circuit of the dynamo and operable by the electro-magnet to cut in the resistance coil when the current in said magnet approximates a certain value, the regulator coils being so related as to their lengths and number of turns as to cause the release of the short-circuiting switch and consequent cutting out of the resistance coil from the shunt field circuit of the dynamo when the charging current is below a certain value.

3. In an electrical system of the character described, the combination of a compound dynamo, a storage battery and electrical connections between the dynamo and battery for operating the dynamo as a motor and for charging the battery by the dynamo current, the series winding and shunt winding of the dynamo being connected to their respective circuits so that their magnetic effect will be in harmony when the dynamo is operated as a motor and in opposition when the dynamo is generating current, said connections including therein an automatic current regulator comprising an electro-magnet having a primary coil in the battery and armature circuits in series with the series winding of the dynamo, and a resistance in shunt with the battery circuit and armature circuit and in series with the shunt winding of the dynamo, both of the regulator coils being arranged to act in harmony as to their magnetic effect, and a short-circuiting switch connected in parallel with the resistance coil to the shunt field circuit of the dynamo and operable by the electro-magnet to cut in the resistance coil when the current in said magnet approximates a certain value, and an external working circuit connected to the battery circuit to receive current from the battery or from the dynamo.

4. The combination of a compound dynamo and storage battery electrically connected thereto in such manner that the battery current may operate the dynamo as a motor and the dynamo current may charge the battery, the connections between the battery and dynamo including therein a primary coil in series with the series winding of the dynamo, and a resistance coil in shunt with both the battery charging circuit and motor circuit and also connected in series with the shunt winding of the dynamo, said coils constituting a part of an electro-magnet and wound to act in harmony as to their magnetic effect, and a short-circuiting device for the resistance coil operated by the magnetic effect of the current in both coils to cut in the resistance in the shunt circuit of the dynamo when the current in the primary coil approximates a predetermined value.

5. The combination of a compound dynamo and storage battery electrically connected thereto in such manner that the battery current may operate the dynamo as a motor and the dynamo current may charge the battery, the connections between the battery and dynamo including therein a primary coil in series with the series winding of the dynamo, and a resistance coil in shunt with both the battery charging circuit and motor circuit and also connected in series with the shunt winding of the dynamo, said coils constituting a part of an electro-magnet and wound to act in harmony as to their magnetic effect, and a short-circuiting device for the resistance coil operated by the magnetic effect of the current in both coils to cut in the resistance in the shunt circuit of the dynamo when the current in the primary coil approximates a predetermined value, said resistance coil having a sufficient number of ampere turns when energized to approximately offset the reduction in the number of ampere turns in the primary coil by the cutting in of the resistance coil and thereby preventing undue vibration of the short-circuiting device.

In witness whereof I have hereunto set my hand this 20th day of June, 1914.

ALBERT E. DOMAN.

Witnesses:
M. H. GRACE,
E. R. LA CARSE.